United States Patent
Whitehead (10) Patent No.: US 10,052,642 B2
(45) Date of Patent: Aug. 21, 2018

(54) CENTRIFUGAL AIR CLEANING SYSTEM AND METHOD

(71) Applicant: Mark Harold Whitehead, Independence, MO (US)

(72) Inventor: Mark Harold Whitehead, Independence, MO (US)

( * ) Notice: Subject to any disclaimer, the term of this patent is extended or adjusted under 35 U.S.C. 154(b) by 263 days.

(21) Appl. No.: 15/148,091

(22) Filed: May 6, 2016

(65) Prior Publication Data

US 2016/0263590 A1     Sep. 15, 2016

Related U.S. Application Data (63) Continuation-in-part of application No. 14/591,196, filed on Jan. 7, 2015.

(Continued)

(51) Int. Cl.

| | |
|---|---|
| *B01D 45/08* | (2006.01) |
| *B04C 9/00* | (2006.01) |
| *B03C 1/14* | (2006.01) |
| *B03C 1/30* | (2006.01) |
| *B01D 45/12* | (2006.01) |
| *B01D 45/14* | (2006.01) |

(Continued)

(52) U.S. Cl.
CPC ............... *B04C 9/00* (2013.01); *B01D 45/08* (2013.01); *B01D 45/12* (2013.01); *B01D 45/14* (2013.01); *B01D 45/16* (2013.01); *B03C 1/14* (2013.01); *B03C 1/30* (2013.01); *B04C 3/06* (2013.01); *B01D 46/0086* (2013.01); *B01D 46/10* (2013.01); *B01D 46/444* (2013.01); *B03C 2201/18* (2013.01); *B03C 2201/20* (2013.01); *B04C 2003/003* (2013.01); *B04C 2003/006* (2013.01)

(58) Field of Classification Search
CPC .. B01D 45/16; B01D 46/0086; B01D 46/444; B01D 46/10; B01D 45/14; B01D 45/12; B01D 45/08; B04C 3/06; B04C 2003/006; B04C 2003/003; F02M 35/024; Y02T 10/47
See application file for complete search history.

(56) References Cited

U.S. PATENT DOCUMENTS

| | | | | |
|---|---|---|---|---|
| 5,224,604 A | * | 7/1993 | Duczmal | B03C 1/023 209/12.2 |
| 6,355,178 B1 | * | 3/2002 | Couture | B01D 45/16 210/223 |

(Continued)

*Primary Examiner* — Dung H Bui
(74) *Attorney, Agent, or Firm* — Mashburn Law Office, LLC; Donna Denise Mashburn Chapman (57) ABSTRACT

A centrifugal air cleaning system broadly comprises an insert cartridge including a housing, an inlet, one or more flow guides, a stator, a compression nozzle, an expansion nozzle, and an outlet. The flow guides guide air flowing into the inlet past the stator into the compression nozzle. The stator induces a rotational vortex into the air flow. Air with heavier particles in the air flow is urged to the outside of the rotational vortex. Air with lighter particles and cleaner air is urged to the inside of the rotational vortex. The compression nozzle and the expansion nozzle are aligned to cooperatively form an annular exhaust channel. The air with the heavier particles flows through the annular exhaust channel and the air with the lighter particles and the cleaner air flows to the expansion nozzle to the outlet.

17 Claims, 4 Drawing Sheets

Related U.S. Application Data

(60) Provisional application No. 61/947,090, filed on Mar. 3, 2014.

(51) Int. Cl.
| | | |
|---|---|---|
| *B01D 45/16* | (2006.01) | |
| *B04C 3/06* | (2006.01) | |
| B01D 46/00 | (2006.01) | |
| B01D 46/10 | (2006.01) | |
| B01D 46/44 | (2006.01) | |
| B04C 3/00 | (2006.01) | |

(56) References Cited

U.S. PATENT DOCUMENTS

| | | | |
|---|---|---|---|
| 2004/0256312 A1* | 12/2004 | Gomez | B01D 19/0052 210/512.3 |
| 2007/0209334 A1* | 9/2007 | Conrad | A47L 5/28 55/337 |
| 2008/0009402 A1* | 1/2008 | Kane | B01D 45/14 494/53 |
| 2010/0132656 A1* | 6/2010 | Doering | F02M 35/022 123/198 E |

* cited by examiner

CENTRIFUGAL AIR CLEANING SYSTEM AND METHOD

RELATED APPLICATION

This application is a continuation-in-part of non-provisional application Ser. No. 14/591,196 filed on Jan. 7, 2015 and entitled "CENTRIFUGAL AIR CLEANING SYSTEM AND METHOD". The '196 application in turn claims priority to provisional application No. 61/947,090 filed on Mar. 3, 2014. The '196 application and the '090 application are hereby incorporated by reference in their entireties.

SUMMARY

The present invention is a centrifugal air cleaning system constructed in accordance with embodiments of the present invention. The centrifugal air cleaning system broadly comprises a housing, an inlet, an outlet, one or more flow guides, a stator, a compression nozzle, an expansion nozzle, one or more mounting brackets, and an exhaust extraction system. The centrifugal air cleaning system is positioned in an HVAC air duct upstream from the HVAC filter. The flow guides guide air flowing through the air duct past the stator into a central flow chamber. The stator includes a number of fins having angular surfaces for inducing a rotating vortex in the air flow. The compression nozzle gradually narrows for gradually compressing the air to increase velocity of the air flow. The expansion nozzle extends into the end of the compression nozzle and gradually widens therefrom. The expansion nozzle and the compression nozzle cooperatively form an annular extraction channel therebetween. The mounting brackets secure or support the housing in the air duct.

Air flowing into the inlet flows past the stator, which induces a rotating vortex in the air flow. Heavier air in the air flow is urged to the outside of the rotating vortex while lighter and cleaner air is urged to the inside of the rotating vortex. The heavier air is then forced through the annular extraction channel and then pumped through the exhaust extraction system to the outdoors. The lighter air continues through the expansion nozzle to the filter.

In one embodiment of the present invention, the centrifugal air cleaning system includes a number of air guides positioned in the compression nozzle for guiding air towards the annular extraction channel. The air guides may be electromagnetically charged for attracting ions and unwanted gases and other contaminants towards the annular extraction channel. The centrifugal air cleaning system may also include a number of magnets positioned around the compression nozzle near the air guides for inducing an electromagnetic charge between the air guides and the air and/or the compression nozzle and the air for enhancing the electromagnetic attraction therebetween. Alternatively, the air guides may be charged via an electronic power system. In yet another embodiment, the magnets may be used without the air guides.

This summary is provided to introduce a selection of concepts in a simplified form that are further described in the detailed description below. The summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

The drawing figures do not limit the current invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the current invention. The following detailed description is, therefore, not to be taken in a limiting sense. The scope of the current invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Figure 1:
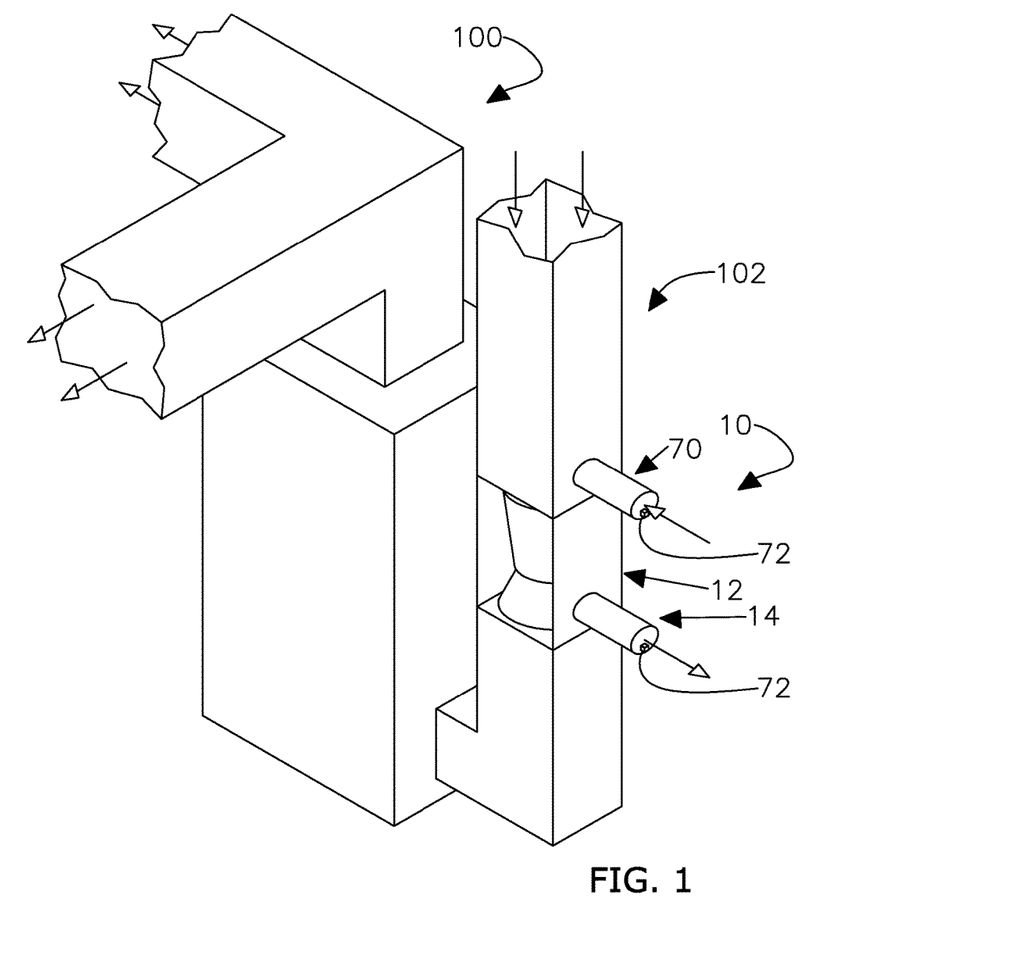
FIG. 1 is a perspective view of an HVAC system including a centrifugal air cleaning system constructed in accordance with an embodiment of the present invention.
Figure 2:
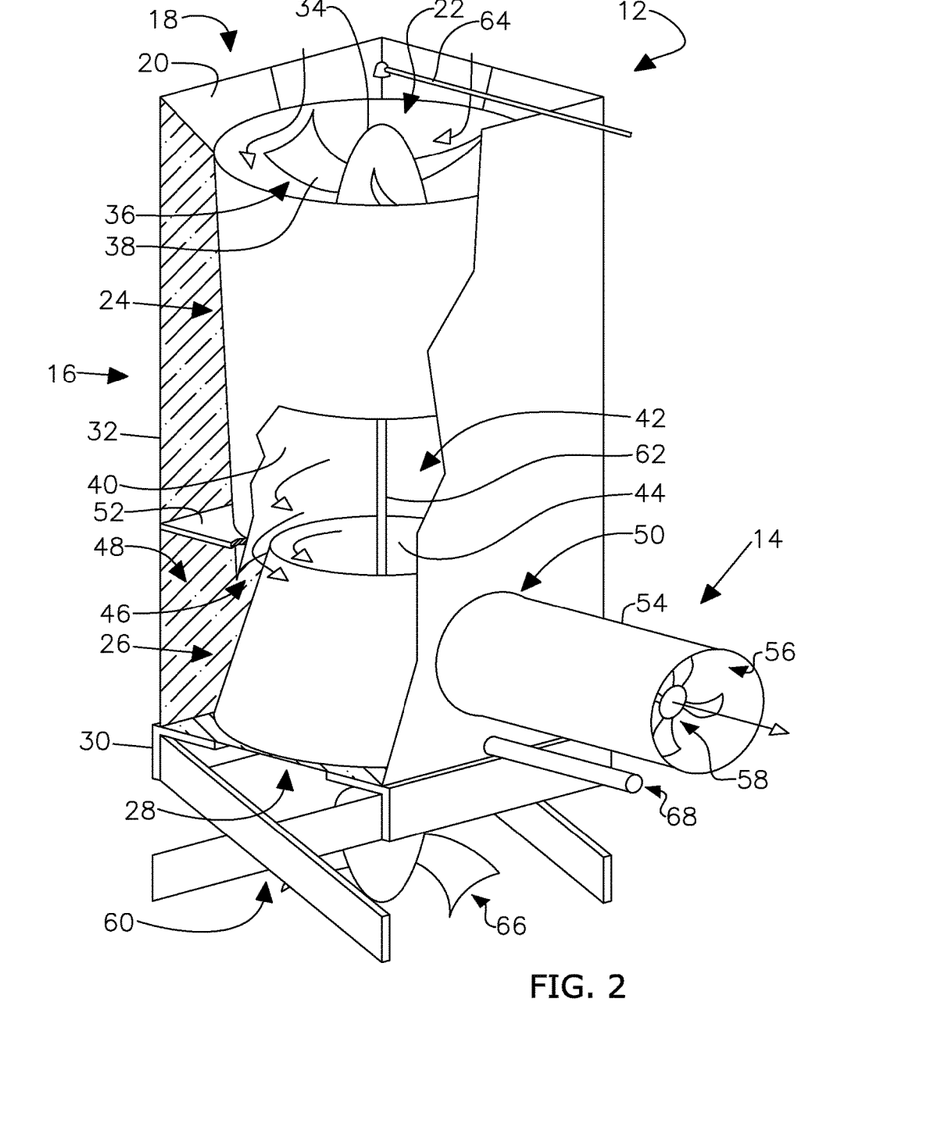
FIG. 2 is an enlarged perspective view of the centrifugal air cleaning system of FIG. 1.

Turning now to the drawing figures, and particularly FIGS. 1 and 2, a centrifugal air cleaning system 10 constructed in accordance with an embodiment of the present invention is illustrated. The centrifugal air cleaning system 10 broadly includes an insert cartridge 12 and an exhaust extraction assembly 14.

The insert cartridge 12 induces a centrifugal vortex into the airstream of an HVAC system 100 and broadly comprises a housing 16, an inlet 18, one or more flow guides 20, a stator 22, a compression nozzle 24, an expansion nozzle 26, an outlet 28, and mounting brackets 30.

The housing 16 provides structural support and at least partially encloses the flow guides 20, stator 22, compression nozzle 24, and expansion nozzle 26 and may be formed of aluminum, steel, or any other suitable material. The housing 16 may be cylindrical or shaped similar to the air duct 102 of the HVAC system 100 and may include one or more sidewalls 32 for abutting an inner surface of the air duct 102 and/or providing a structural base for the above components.

The inlet 18 receives air from the air duct 102 and extends into the housing 16 from an upstream end of the insert cartridge. The inlet 18 may be circular, square, or other suitable shape for receiving airflow from a typically square air duct 102. The inlet 18 may be shaped as closely as possible to the shape of the air duct 102 so that air flow is not instantaneously restricted at the inlet 18.

The flow guides 20 guide the air coming into the inlet 18 past the stator 22 into the compression nozzle 24 and gradually angle or curve inward from near the outside of the housing 16 to a beginning portion of the compression nozzle 24. The flow guides 20 may be angled slightly more than or less than or the same as the compression nozzle 24. The flow guides 20 may alternatively take any other shape that gradually changes from the rectangular shape of the air duct 102 to the circular shape of the compression nozzle 24 or improves air flow between the air duct 102 to the compression nozzle 24. The flow guides 20 may also be an indistinguishable upstream portion of the compression nozzle 24.

The stator 22 induces rotational flow in the air entering the compression nozzle 24 and may be stationary and positioned near the inlet 18 between the flow guides 20 and the compression nozzle 24. The stator 22 may be a fan-shaped component including a central hub 34 and one or more fins 36. The central hub 34 may be a curved conical shape or similar aerodynamic shape for minimizing the drag it induces into the flowing air. The angled fins 36 extend from the central hub 34 to the flow guides 20 and/or compression nozzle 24 and include angled surfaces 38 for directing the incoming air into a rotating vortex pattern.

The compression nozzle 24 guides the air from the stator 22 into a gradually tighter vortex and is connected to or extends from the flow guides 20 to just beyond the expansion nozzle 26. The compression nozzle 24 has a conical angled surface 40 that gradually narrows from the stator 24 to just beyond the expansion nozzle 26. The end of the compression nozzle 24 is slightly wider than the beginning of the expansion nozzle 26. The compression nozzle 24 forms a central flow chamber 42 through which the vortex of air flows. The flow guides 20 and/or the compression nozzle 24 may also include spiral ridges for mounting the stator 22 thereto.

The expansion nozzle 26 guides air from the central flow chamber 42 to the outlet 28 and extends from just inside the end of the compression nozzle 24 to the outlet 28. The expansion nozzle 26 has an angled surface 44 that gradually widens from just inside the end of the compression nozzle 24 to the outlet 28. The expansion nozzle 26 may be coaxially aligned with the compression nozzle 24. The beginning of the expansion nozzle 26 is slightly narrower than the end of the compression nozzle 24 so that the compression nozzle 24 and the expansion nozzle 28 cooperatively form an annular extraction channel 46 therebetween. The annular extraction channel 46 is substantially circular and allows heavier air to flow therethrough to an exhaust collection chamber 48. The exhaust collection chamber 48 surrounds the expansion nozzle 26 and at least part of the compression nozzle 24 and accumulates the heavier air from the annular extraction channel 46 before the heavier air continues to the exhaust extraction assembly 14. The exhaust collection chamber 48 includes an opening 50 in the housing 16 for the air to flow to the exhaust extraction assembly 14. The exhaust collection chamber 48 may be at least partially enclosed by one or more vacuum baffles 52 connected to the outside of the compression nozzle 24 and the housing 16 to retain air in the exhaust collection chamber 48. The vacuum baffles 52 may also serve to stabilize or support the compression nozzle 24.

The outlet 28 allows air cleaned by the system 10 to continue flowing towards the filter of the HVAC system 100 and may be circular, square, or other suitable shape for allowing air to flow back into the typically square air duct 102. It is not as important for the outlet 28 to gradually conform to the shape of the air duct 102 as much as the inlet 18 because the cross section of the air flow is increasing at the outlet 28, but doing so still improves overall airflow through the air duct 102.

The mounting brackets 30 secure the housing 16 to the air duct 102 and may be angle irons, studs, beams, or any other type of mounting member. The mounting brackets 30 may include fasteners for attaching the housing 16 to the mounting brackets 30 or may simply support the housing 16. Alternatively, the housing 16 may be welded to the mounting brackets 30. The mounting brackets 30 may also be fastened or welded to the air duct 102.

The exhaust extraction assembly 14 removes heavier air, as described below, and broadly includes an exhaust pipe 54 and an exhaust fan 58.

The exhaust pipe 54 guides the heavier air to the outdoors or to an exhaust output duct and is connected to the housing 16 at the opening 50. The exhaust pipe 54 may be formed of standard circular piping or rectangular duct and forms an exhaust flow chamber 56 therethrough.

The exhaust fan 58 forces the heavier air from the exhaust collection chamber 48 through the exhaust flow chamber 56 and may be a conventional HVAC fan.

The centrifugal air cleaning system 10 operates as follows: first, air being returned to an HVAC blower box via a return air duct 102 or other air duct passes through the centrifugal air cleaning system upstream from the HVAC filter. The air enters the cleaning system 10 via the inlet 18. The flow guides 20 then guide the air through past the stator 22 into the compression nozzle 24. The flow guides 20 also convert the rectangular air flow in the air duct to a circular air flow profile. The stator 22 induces a rotational vortex in the air flow via the angled surfaces 38 of the fins 36 as the air enters the central flow channel 42. Heavier air including larger dust and debris particles will be urged to the outermost portion of the vortex while lighter air with smaller particles and cleaner air will tend to remain in the innermost portion of the vortex due to centrifugal interactions between the differently weighted air. The conical angled surface 40 of the compression nozzle 24 reduces turbulent flow and the buildup of eddy currents and compresses the air flow into a smaller flow profile. The compression due to the reduced flow profile linearly increases flow velocity which increases the centrifugal effect. The compression also encourages interaction between the air particles and thus encourages the heavy air and lighter air organization as described above.

The heavier air including the larger dust and debris particles is separated from the lighter air by continuing through the annular extraction channel 46. The heavier air then enters the exhaust collection chamber 48 and then is pumped through the exhaust flow chamber 56 of the exhaust pipe 54 via the exhaust fan 58 to the outdoors or to an additional exhaust duct system. The exhaust fan 58 also draws the heavier air through the annular extraction channel 46. The lighter air including the smaller particles and cleaner air continues through the expansion nozzle 26, through the outlet 28, and towards or into a return air filter and/or HVAC blower.

Figure 3:
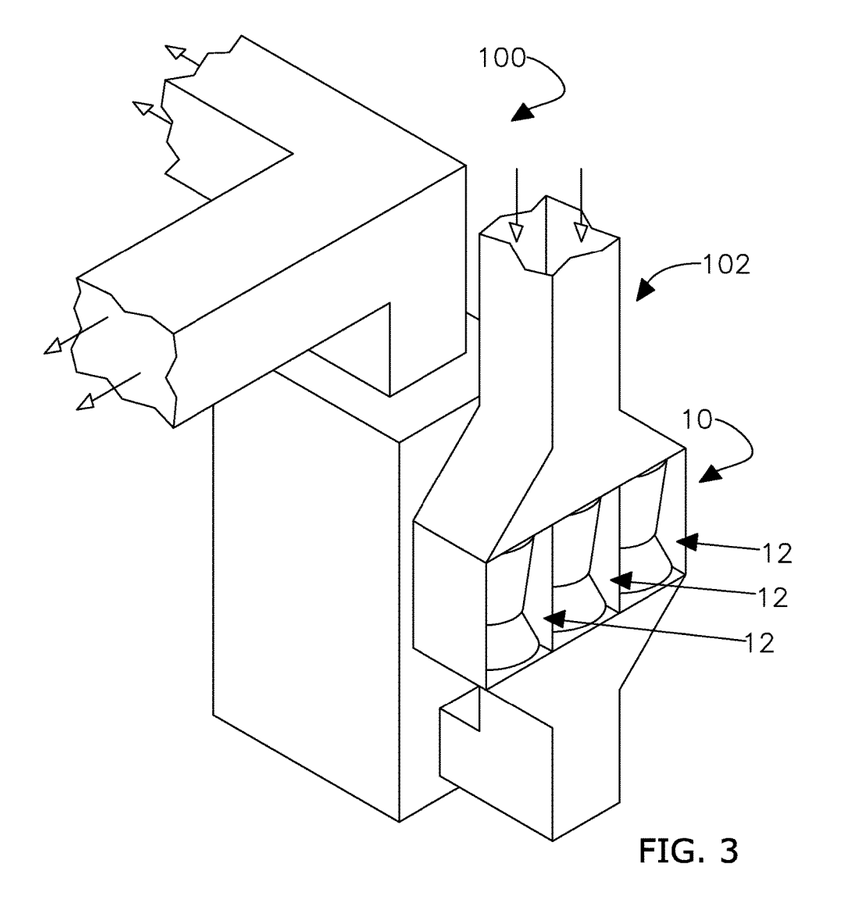
FIG. 3 is a perspective view of another HVAC system including a centrifugal air cleaning system constructed in accordance with another embodiment of the present invention.

In an additional embodiment, as shown in FIG. 3, a number of insert cartridges 12 are mounted side by side in the air duct 102. The exhaust collection chambers 48 of the insert cartridges 12 may be isolated or may be combined as one.

Turning again to FIG. 2, in yet another embodiment, for high volume flow requirements, cross braces 60 and an axial stator shaft 62 may be attached to the mounting brackets 30 with the cross braces 60 extending to and supporting the compression nozzle 24 and the expansion nozzle 26 and the axial stator shaft 62 extending to and supporting the central hub 34 of the stator 22.

In yet another embodiment, an optional nozzle 64 may be positioned upstream from the stator 22 to inject atomized water into the air flow. The water molecules will cling to the heavier particles, adding weight to them and promoting their movement to the outside of the rotational vortex.

In yet another embodiment, a booster fan 66 may be positioned downstream from the expansion nozzle 28 to create negative pressure in the central flow chamber 42 and promote air flow from the inlet 18 to the outlet 28.

In yet another embodiment, a drain pipe 68 may be positioned at the bottom of the exhaust collection chamber 48 for draining moisture and for allowing the exhaust collection chamber 48 to be cleaned.

In yet another embodiment, as shown in FIG. 1, an extraction return air pipe 70 may be connected to the air duct 102 upstream from the insert cartridge 12 for injecting clean air from the outdoors into the air flow.

In yet another embodiment, one or more sensors 72 may be positioned in the exhaust pipe 54, the extraction return air pipe 70, and/or other airflow positions for monitoring the performance of the centrifugal air cleaning system 10. The sensors 72 may be airflow sensors for monitoring airspeed, chemical sensors for detecting harmful particles, or any other suitable sensors.

The above-described centrifugal air cleaning system 10 increases the lifespan of the filter, which reduces the risk of fire and improves the effectiveness of the filter. The centrifugal air cleaning system 10 also reduces strain incurred on the HVAC system when the filter is clogged. The centrifugal air cleaning system 10 also removes harmful particles from the air in addition to the particles trapped by the filter. The centrifugal air cleaning system 10 removes heavy gases such as radon, house dust, mold, pet dander, and other microbial and pathogenic contaminants directly to the outdoors.

Figure 4:
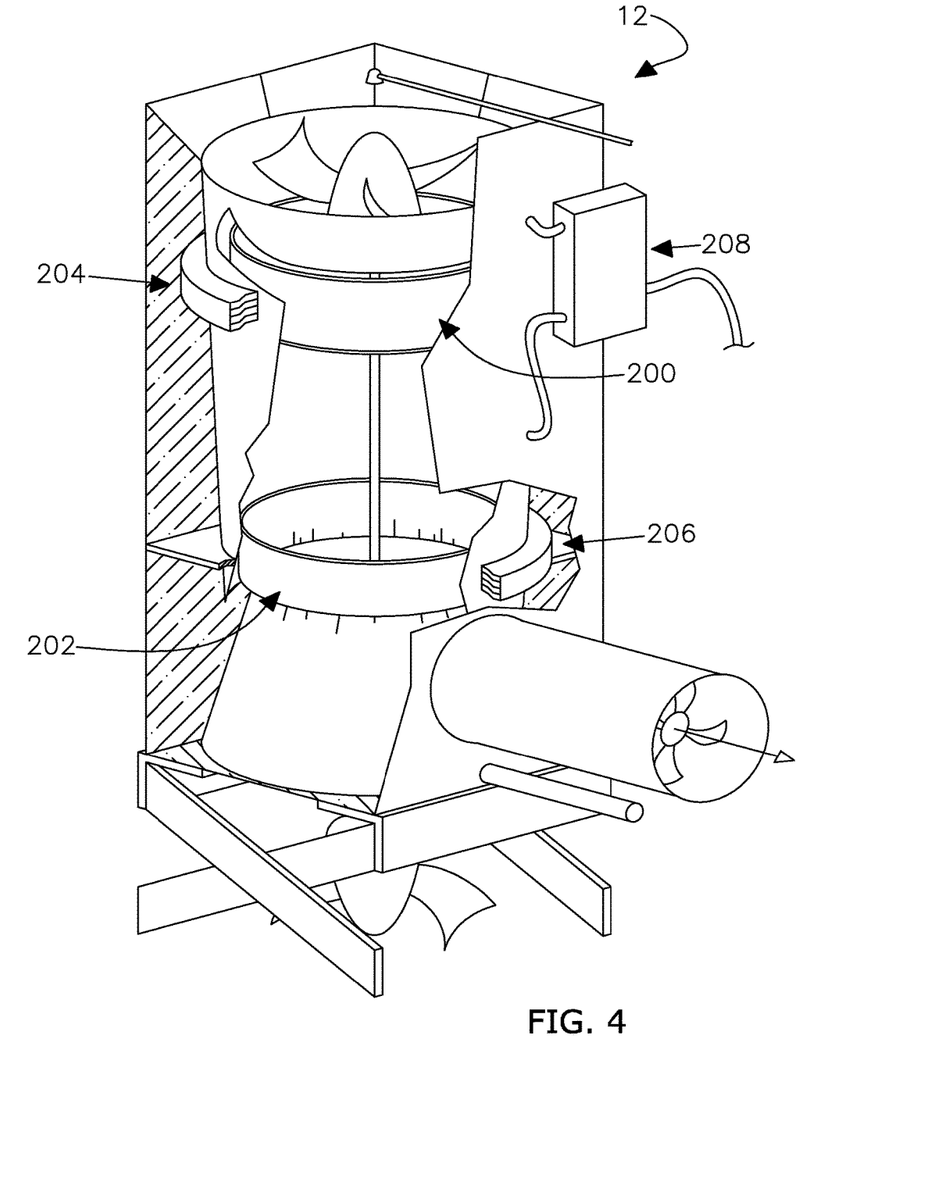
FIG. 4 is an enlarged perspective view of a centrifugal air cleaning system constructed in accordance with another embodiment of the invention.

Turning to FIG. 4, in an additional embodiment of the present invention, the insert cartridge 12 of the centrifugal air cleaning system 10 further comprises an inlet air guide 200 and a gap air guide 202 for electrostatically attracting or guiding contaminants, particles, etc. towards the annular extraction channel 46.

The inlet air guide 200 may be a circular ring positioned near the first end of the compression nozzle 24 in the central flow channel 42 and may be formed of ferrous sheet metal or other suitable material. For example, in one embodiment, the inlet air guide 200 may be spaced approximately one inch from the central hub 34 and may be spaced approximately one inch from the interior surface of the first end of the compression nozzle 24.

The gap air guide 202 may be a circular ring positioned near the second end of the compression nozzle 24 or otherwise spaced from the inlet air guide 200 and may be at least partially positioned in the annular extraction channel 46. The gap air guide 202 may have a smaller diameter than the inlet air guide 200.

The insert cartridge 12 of the centrifugal air cleaning system 10 may further comprise a first permanent magnet 204 and a second permanent magnet 206 for electromagnetically attracting contaminants and/or unwanted gases towards and into the annular extraction channel 46.

The first permanent magnet 204 may be a toroidal ring or other magnet or magnet assembly and may be positioned near the first end of the compression nozzle 24. The first permanent magnet 204 may have a larger diameter than the first end of the compression nozzle 24 and may be positioned around the first end of the compression nozzle 24. For example, the first permanent magnet 204 may be longitudinally and concentrically aligned with the inlet air guide 200.

The second permanent magnet 206 may be a toroidal ring or other magnet or magnet assembly and may be spaced from the first permanent magnet 204 and positioned near the second end of the compression nozzle 24. The second permanent magnet 206 may have a larger diameter than the second end of the compression nozzle 24 and may be positioned around the second end of the compression nozzle 24. For example, the second permanent magnet 206 may be longitudinally and concentrically aligned with the gap air guide 202. The permanent magnet rings 204, 206 may be oriented so as to be magnetically attracted to each other.

In use, the inlet air guide 200 and the gap air guide 202 aerodynamically guide the high velocity air stream close to the wall of the compression nozzle 24. The inlet air guide 200 and the gap air guide 202 also induce air friction charging of the wall of the compression nozzle 24 and contaminants, particles, and gases in the air stream. As the air charges, ionized contaminants, particles, and gases are attracted to the oppositely charged wall of the compression nozzle 24 and are drawn into the annular extraction channel 46. This effect is improved if the inlet air guide 200 and the gap air guide 202 (and other components of the insert cartridge 12) are formed of high density polyethylene.

The electromagnetic effects enhance extraction to include progressive reduction of contaminants located in the air stream, e.g., carbon monoxide, carbon dioxide, radon, other gases and particles. Heavy and light particles and ionized gas contaminants with ionization potential below twenty electron volts are extracted. For example, ammonia, methane, natural gases, petroleum derivatives, radioactive material, biological contaminants, chemical aerosols, and other hazardous industrial chemicals are removed. The paramagnetic nature of oxygen enhances the reduction of these contaminants and particles from the air stream and oxygen levels are increased in the clean air that passes into and through the expansion nozzle 26.

The permanent magnets 204, 206 improve the separation of ionized gases with the addition of the magnetic field in the air stream. Alternatively, the permanent magnets 204, 206 may be used without the inlet air guide 200 and the gap air guide 202.

In yet another embodiment, the inlet air guide 200 and the gap air guide 202 may be electronically energized via a power source 208 such as a 600 volt (or less) DC power supply or other suitable power supply. The inlet air guide 200 and the gap air guide 202 may be oppositely charged and may have their charges reversed via simple electronic controls or circuit set-up. Inducing the electronic charge via the power source 208 may increase extraction of various gases and particles in warm, humid environments.

The above described embodiments provide a number of synergistic improvements. The inlet air guide 200 and gap air guide 202 and the magnets 204, 206 and/or electronic energizing power source create a dipole toroidal magnetic field, which accelerate gas ion contaminant movement towards the annular extraction channel 46. The charged inlet air guide 200 and the gap air guide 202 also create a low friction electrostatic air foil that increases the extraction of carbon dioxide, carbon monoxide, ionized gases, ionized particles, and positive and negative ions from the air stream. Thus, the centrifugal, electrostatic, and electromagnetic forces synergize to cooperatively remove contaminants from air as it flows through the embodiments of the present invention. The above-described invention embodiments can be used in hospitals, schools, cleanrooms, public transportation, public buildings, military facilities, and any other enclosed area where clean air is desired.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A centrifugal air cleaning system comprising:
   an insert cartridge comprising:
      a housing;
      an inlet for receiving an HVAC air flow having relatively heavy particles and relatively light particles;
      a stator positioned near the inlet for inducing a rotational vortex in the air flow;
      a compression nozzle including a first end near the stator, a conical angled surface, and second end opposite the first end, the conical angled surface forming a central flow channel and configured to increase the velocity of the air flow through the central flow channel;
      an expansion nozzle including a first end near the second end of the compression nozzle, a conical angled surface; and a second end opposite the first end of the expansion nozzle, the first end of the expansion nozzle being smaller in diameter than the second end of the compression nozzle so as to form an annular extraction channel;
      an outlet opposite the inlet near the second end of the expansion nozzle;
      an inlet air guide positioned in the central flow channel near the first end of the compression nozzle, wherein the inlet air guide is a circular ring having a smaller diameter than the first end of the compression nozzle, wherein the inlet liquid guide and the gap liquid guide are spaced from the interior surface of the compression nozzle; and
      a gap air guide positioned in the central flow channel near the second end of the compression nozzle, wherein the gap air guide is a circular ring having a smaller diameter than the second end of the compression nozzle,
      wherein the heavier particles are urged to the outside of the rotational vortex and the lighter particles are urged to the inside of the rotational vortex so that air with the heavier particles on the outside of the rotational vortex flows through the annular extraction channel and air with the light particles on the inside of the rotational vortex flow through the expansion nozzle and the outlet, the inlet air guide and the gap air guide being configured to attract contaminants and particles towards the annular extraction channel.

2. The centrifugal air cleaning system of claim 1, wherein the the inlet air guide and the gap air guide are made of polyethylene.

3. The centrifugal air cleaning system of claim 1, wherein the gap air guide is positioned at least partially in the annular extraction channel.

4. The centrifugal air cleaning system of claim 1, wherein the gap air guide is made of ferrous material.

5. The centrifugal air cleaning system of claim 1, wherein the gap air guide has a smaller diameter than the inlet air guide.

6. The centrifugal air cleaning system of claim 1, wherein the inlet air guide is made of ferrous material.

7. The centrifugal air cleaning system of claim 1, wherein the inlet air guide and the gap air guide are configured to be electronically charged via a power source for attracting ionized contaminants towards the annular extraction channel.

8. A centrifugal air cleaning system comprising:
   an insert cartridge comprising:
      a housing;
      an inlet for receiving an HVAC air flow having relatively heavy particles and relatively light particles;
      a stator positioned near the inlet for inducing a rotational vortex in the air flow;
      a compression nozzle including a first end near the stator, a conical angled surface, and second end opposite the first end, the conical angled surface forming a central flow channel and configured to increase the velocity of the air flow through the central flow channel;
      an expansion nozzle including a first end near the second end of the compression nozzle, a conical angled surface; and a second end opposite the first end of the expansion nozzle, the first end of the expansion nozzle being smaller in diameter than the second end of the compression nozzle so as to form an annular extraction channel;
      an outlet opposite the inlet near the second end of the expansion nozzle;
      at least one magnetic ring positioned around the compression nozzle;
      an inlet air guide positioned in the central flow channel inside the first end of the compression nozzle, wherein the inlet air guide is a circular ring having a smaller diameter than the first end of the compression nozzle, wherein the inlet liquid guide and the gap liquid guide are spaced from the interior surface of the compression nozzle; and
      a gap air guide positioned in the central flow channel at least partially inside the compression nozzle and near the second end of the compression nozzle, wherein the gap air guide is a circular ring having a smaller diameter than the second end of the compression nozzle,
      wherein the heavier particles are urged to the outside of the rotational vortex and the lighter particles are urged to the inside of the rotational vortex so that air with the heavier particles on the outside of the rotational vortex flows through the annular extraction channel and air with the light particles on the inside of the rotational vortex flow through the expansion nozzle and the outlet, the inlet air guide, the gap air guide and the magnetic ring being configured to attract contaminants towards the annular extraction channel.

9. The centrifugal air cleaning system of claim 8, wherein the magnetic ring is positioned near the first end of the compression nozzle.

10. The centrifugal air cleaning system of claim 9, wherein the inlet air guide is longitudinally aligned with the magnetic ring near the first end of the compression nozzle.

11. The centrifugal air cleaning system of claim 8, wherein the magnetic ring is positioned near the second end of the compression nozzle.

12. The centrifugal air cleaning system of claim 11, wherein the gap air guide is longitudinally aligned with the magnetic ring near the second end of the compression nozzle.

13. The centrifugal air cleaning system of claim 8, wherein the gap air guide is positioned at least partially in the annular extraction channel.

14. The centrifugal air cleaning system of claim 8, wherein the magnetic ring comprises two magnetic rings spaced from each other.

15. The centrifugal air cleaning system of claim 8, wherein the two magnetic rings are oriented so as to be magnetically attracted to each other.

16. The centrifugal air cleaning system of claim 8, wherein the inlet air guide and the gap air guide are made of ferrous material.

17. A centrifugal air cleaning system comprising:
    an insert cartridge comprising:
        a housing;
        an inlet for receiving an HVAC air flow having relatively heavy particles and relatively light particles;
        a stator positioned near the inlet for inducing a rotational vortex in the air flow;
        a compression nozzle including a first end near the stator, a conical angled surface, and second end opposite the first end, the conical angled surface forming a central flow channel and configured to increase the velocity of the air flow through the central flow channel;
        an expansion nozzle including a first end near the second end of the compression nozzle, a conical angled surface; and a second end opposite the first end of the expansion nozzle, the first end of the expansion nozzle being smaller in diameter than the second end of the compression nozzle so as to form an annular extraction channel;
        an outlet opposite the inlet near the second end of the expansion nozzle;
        an inlet air guide positioned near the first end of the compression nozzle in the central flow channel, wherein the inlet air guide is a circular band having a smaller diameter than the first end of the compression nozzle;
        a gap air guide positioned near the second end of the compression nozzle and at least partially in the annular extraction channel wherein the gap air guide is a circular band having a smaller diameter than the second end of the compression nozzle, wherein the inlet liquid guide and the gap liquid guide are spaced from the interior surface of the compression nozzle;
        a first magnetic ring positioned around the first end of the compression nozzle and longitudinally aligned with the inlet air guide; and
        a second magnetic ring positioned around the second end of the compression nozzle and longitudinally aligned with the gap air guide,
    wherein the heavier particles are urged to the outside of the rotational vortex and the lighter particles are urged to the inside of the rotational vortex so that air with the heavier particles on the outside of the rotational vortex flows through the annular extraction channel and air with the light particles on the inside of the rotational vortex flow through the expansion nozzle and the outlet, the magnetic rings and the inlet air guide and the gap air guide cooperatively being configured to attract contaminants towards the annular extraction channel.

* * * * *